United States Patent [19]

Waaske

[11] 4,219,265
[45] Aug. 26, 1980

[54] PHOTOGRAPHIC VIEW FINDER CAMERA WITH RETRACTABLE LENS TUBE

[75] Inventor: Heinz Waaske, Konstrukteur, Fed. Rep. of Germany

[73] Assignee: Rollei-Werke Franke & Heidecke, Braunschweig, Fed. Rep. of Germany

[21] Appl. No.: 53,978

[22] Filed: Jul. 2, 1979

[30] Foreign Application Priority Data

Jul. 5, 1978 [DE] Fed. Rep. of Germany ....... 2829459

[51] Int. Cl.³ .............................................. G03B 17/04
[52] U.S. Cl. ..................................... 354/187; 354/206; 354/288
[58] Field of Search ............... 354/187, 204, 206, 212, 354/213, 288

[56] References Cited

U.S. PATENT DOCUMENTS

| 4,019,192 | 4/1977 | Miyagawa ............................ 354/187 |
| 4,171,886 | 10/1979 | Stemme et al. ................... 354/204 X |

FOREIGN PATENT DOCUMENTS

| 1150867 | 6/1963 | Fed. Rep. of Germany ........... 354/204 |
| 715273 | 9/1954 | United Kingdom . |
| 1157783 | 7/1969 | United Kingdom . |
| 1223247 | 2/1971 | United Kingdom . |
| 1310973 | 3/1973 | United Kingdom . |

Primary Examiner—John Gonzales
Attorney, Agent, or Firm—Staas & Halsey

[57] ABSTRACT

A photographic view finder camera having a retractable lens tube. A rocking control handle on the front of the camera housing operates as a lever and is rocked to project and retract the lens tube, wind the film and cock the shutter.

12 Claims, 7 Drawing Figures

PHOTOGRAPHIC VIEW FINDER CAMERA WITH RETRACTABLE LENS TUBE

BACKGROUND OF THE INVENTION

1. Field of the Invention

The invention relates generally to a photographic view finder camera using cassette film and having a lens tube which is retracted into the camera housing in a storage position and which is projected from the camera housing in an operative position.

2. Description of the Prior Art

View finder cameras employing cassette film usually couple all of the important functions of the camera to the shifting motion of one of the two housing parts. It is desirable to protect the sensitive parts of the camera against exterior objects which may damage the sensitive parts. Therefore, the lenses, the view finder, the exposure sensors, . . . are preferably covered when the camera housing is in a storage position, whereas when the camera is in its operational position the film is advanced and the shutter is cocked. Cameras which use 126 cassette film also have a lens tube which projects out from the camera when the camera housing is opened and which retracts into the camera when the housing is closed. The movement of the cassette and film (which need not be rewound) is interconnected with the movement of other parts of the camera.

A common problem with known view finder cameras is that it is difficult to construct a small view finder camera which is trouble free and which can be easily handled. It is impractical to advance the cartridge with a single housing motion because of the length of each picture frame. Multiple motions of the housing would result in an undesirable multiple movement of the lens tube. In addition, release of the film from the housing is very difficult because of the many decoupling connections which are necessary to make manual rewinding of the film possible.

SUMMARY OF THE INVENTION

An object of the present invention is to provide a camera of the above-mentioned kind which may be operated as simply as housing-operated cameras, i.e., the film can be advanced, the shutter can be cocked, the lens can be exposed in an operating position, the lens tube can be projected into a working position and retracted into a storage position and the lens can be covered, through the manipulation of a single control handle.

Another object of this invention is to reduce the number of control handles required for the above-mentioned functions, thus enabling the use of a smaller and more compact camera housing. At the same time sufficient protection for the sensitive components of the camera such as the lens, the view finder and the sensors, is provided without additional accessories (case, lens cap, etc.).

A feature of this invention is that a control handle is provided which is first guided parallel to the front side of the camera housing, and which secondly forms a rocker arm which can be rotated around an axis at one edge of the camera housing so that the control handle is at an angle with respect to the front of the camera housing. This handle is manipulated in order to perform the functions necessary to operate a camera.

Another feature of the invention is that the control element is formed of two pieces, a plate which is rotated about the edge of the camera housing and a masking slide which can be guided on the plate in a longitudinal direction.

Another feature of the device of this invention is that the sensitive parts (e.g., lens and view finder) are protected against exterior objects while in the storage position and the important functions of film advancing and shutter cocking are performed by rcoking the control handle. Both functions are performed in such a way that the photographer's hand is continuously on the control handle. Protection of the sensitive camera elements is provided by the control handle. The masking slide is held and guided on the hinged plate by means of slide guides and is also shifted onto slide guides which are arranged at the front side of the camera housing in the area of the lens tube. The slide guides on the front side of the camera housing form a continuous guideway together with the slide guides of the hinged plate. On this guideway the masking slide can be shifted over the retracted lens and view finder, etc., like a protective cap. Thus, the sensitive lens is protected agains shock. At the same time the hinged plate is held tightly against the camera housing when the camera is in a storage position.

A further advantageous feature of this invention is that when the control handle is set into the rocker position the masking slide protrudes past the axis of rotation at the housing edge. Thus, the control handle forms a rocking arm which operates as a lever. The special characteristic of a lever is that the ratio of the lengths of the two arms (fulcrum to end) determines the amount of force necessary to move the lever. To obtain optimal results it is preferable to have the masking slide shifted to the rocking position so that it projects far enough over the edge of the housing that the force to be exerted by the operator's hand can be held within bounds. In this way it is particularly easy for the operator to advance the film through several rocking movements of the control handle.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1A:
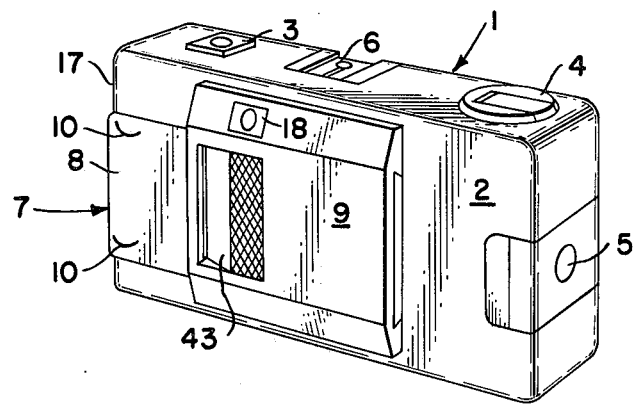
FIG. 1a is a perspective view of a camera in storage position.

FIG. 1a shows a camera 1 in the storage position having its controls, such as shutter release 3, film rewind crank 4 and control handle 7, accessible from outside. Control handle 7 firmly abuts the front of housing 1 and occupies the major portion of the front side 2 of housing 1. The compact and transport-oriented design of the camera in the storage position is further reflected by the fact that the parts not immediately needed for the picture taking functions of the camera also protrude beyond camera housing 1 as little as possible. Thus, the back lock 5 and the flash shoe 6 are completely flush with the surface of housing 1, and the release button 3 (locked in this position) and the rewind crank 4 are substantially flush with the surface of housing 1. The camera is readily carried in a pocket of the photographer.

Figure 1B:
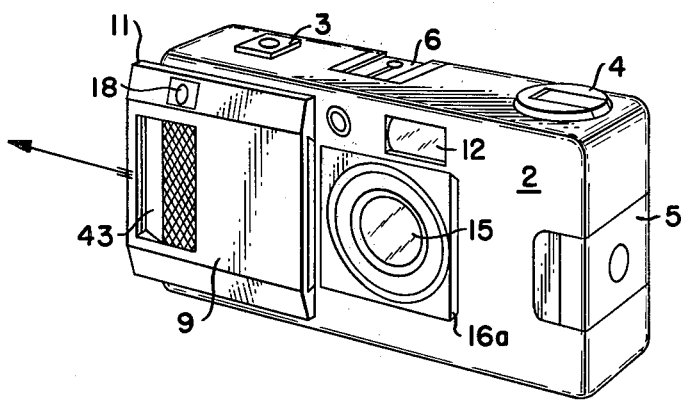
FIG. 1b is a perspective view of a camera with the masking slide shifted laterally.
Figure 1C:
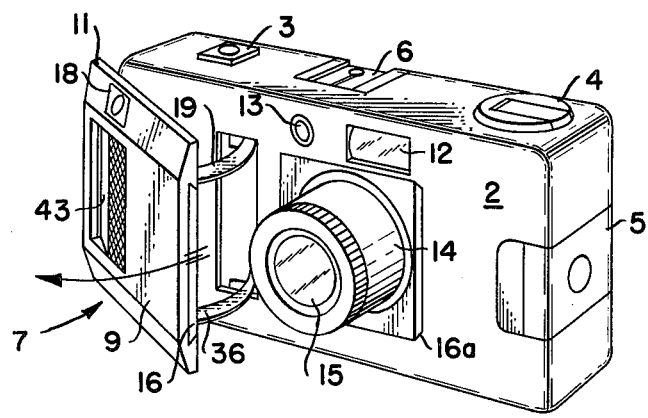
FIG. 1c is a perspective view of a camera with the lens tube in operating position with the control handle in the rocking position.
Figure 1D:
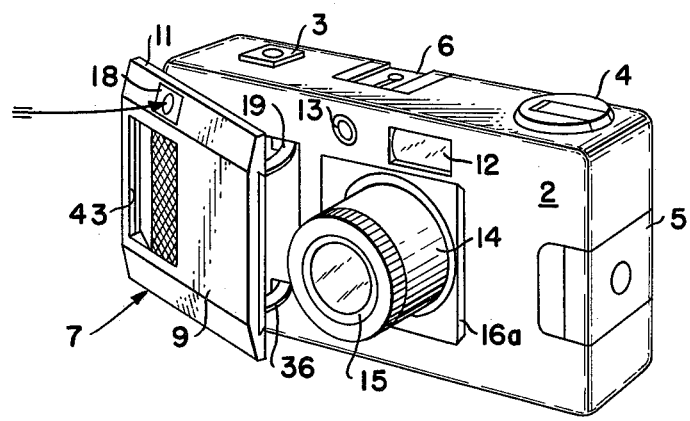
FIG. 1d is a perspective view similar to FIG. 1c prior to the advancement of the film and cocking of the shutter.
Figure 1E:
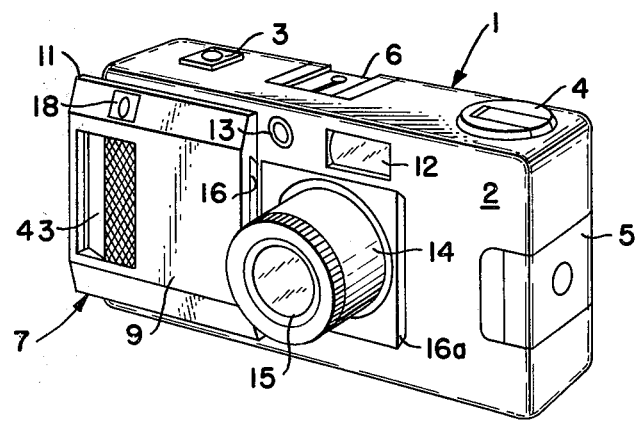
FIG. 1e is a perspective view similar to FIG. 1d following advancement of the film and cocking of the shutter.

FIGS. 1b through 1e and 3 show various operating positions of the camera. A plate 8 (FIG. 1a) is provided with sliding guide 16 (FIG. 1c). To place the camera in an operating position a slidably guided masking slide 9, which was in a storage position covering the lens 15 and the view finder 12, is shifted in the direction shown by the arrow in FIG. 1b until it reaches the position shown in FIG. 1b. A finger grip 43 allows the operator to use four fingers of a hand (with the thumb pushing away from the back of the case) to slide masking slide 9. Sliding guide 16a is positioned around lens 15 and aligns masking slide 9 in its storage position. The masking slide 9 is in the position shown in FIG. 1b when the lens tube 14 is not projected beyond housing 1. When a portion 11 of masking slide 9 extends beyond the edge 17 of housing 2 the control handle 7 is in the rocking position and can be rocked about a fulcrum 10. Fulcrum 10 is a hinge. Thus, in one fluid motion the masking slide 9 is pulled out of the masking position into the rocking position, the control handle 7 is swiveled out of a position parallel to the front 2 of housing 1 and into a position which is at an angle to the front side 2 of the housing 1. When control handle 7 is swiveled an interlocking lever 19 causes the lens tube 14 to move from its retracted position into a position projecting beyond the front 2 of the case 1 and is locked in place. FIG. 1c shows the lens tube 14 after it has been projected, with the control handle 7 still in angular position after the first rocking movement. As will be further explained below, additional rocking movement of the control handle 7, as shown in FIG. 1b, causes the film to advance and the shutter to cock. FIG. 1e shows the operating condition of the camera when it is ready to take a picture. The view finder 12 for the subject selection and the sensor 13 for the exposure control are also operative.

When the camera is in the storage position (FIG. 1a) the masking slide 9 is positioned on the slide tracks 16a (best shown in FIG. 1b) arranged on both sides of the lens tube 14, in order to safely hold the masking slide 9 in place. Thus, a continuous guideway is formed by the slide tracks 16 and 16a. These slide tracks 16, 16a are drawn as dovetails, but they may also be formed in a random prism form.

The functions of film advancement and shutter cocking which are carried out by rocking the control handle 7, require a mechanical connection to drive mechanisms inside the camera. These drive mechanisms are shown in FIGS. 2 and 3.

Figure 2:
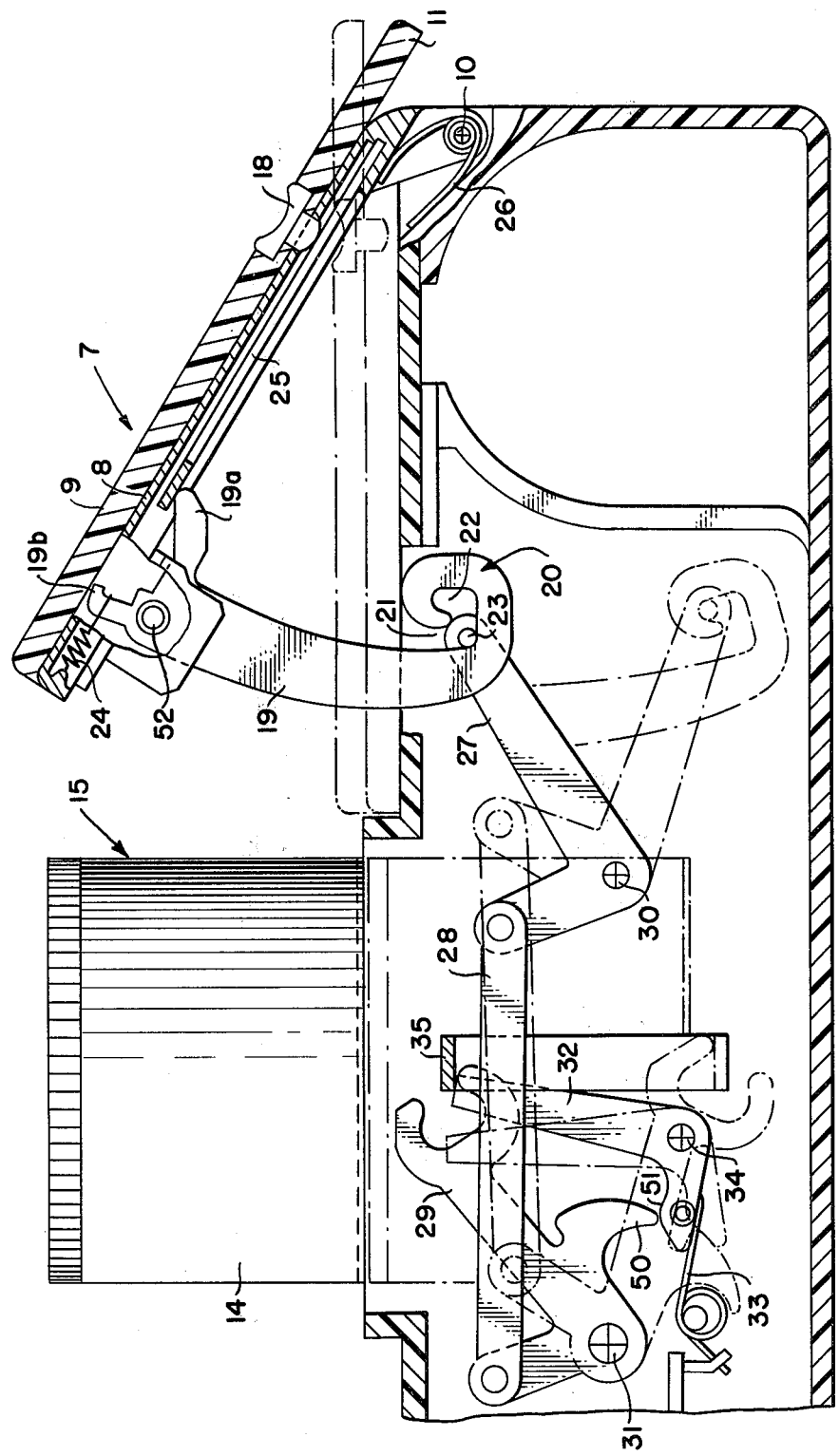
FIG. 2 is a cross-sectional view of the camera in the region of the control handle showing the projection mechanism for the lens tube.
Figure 3:
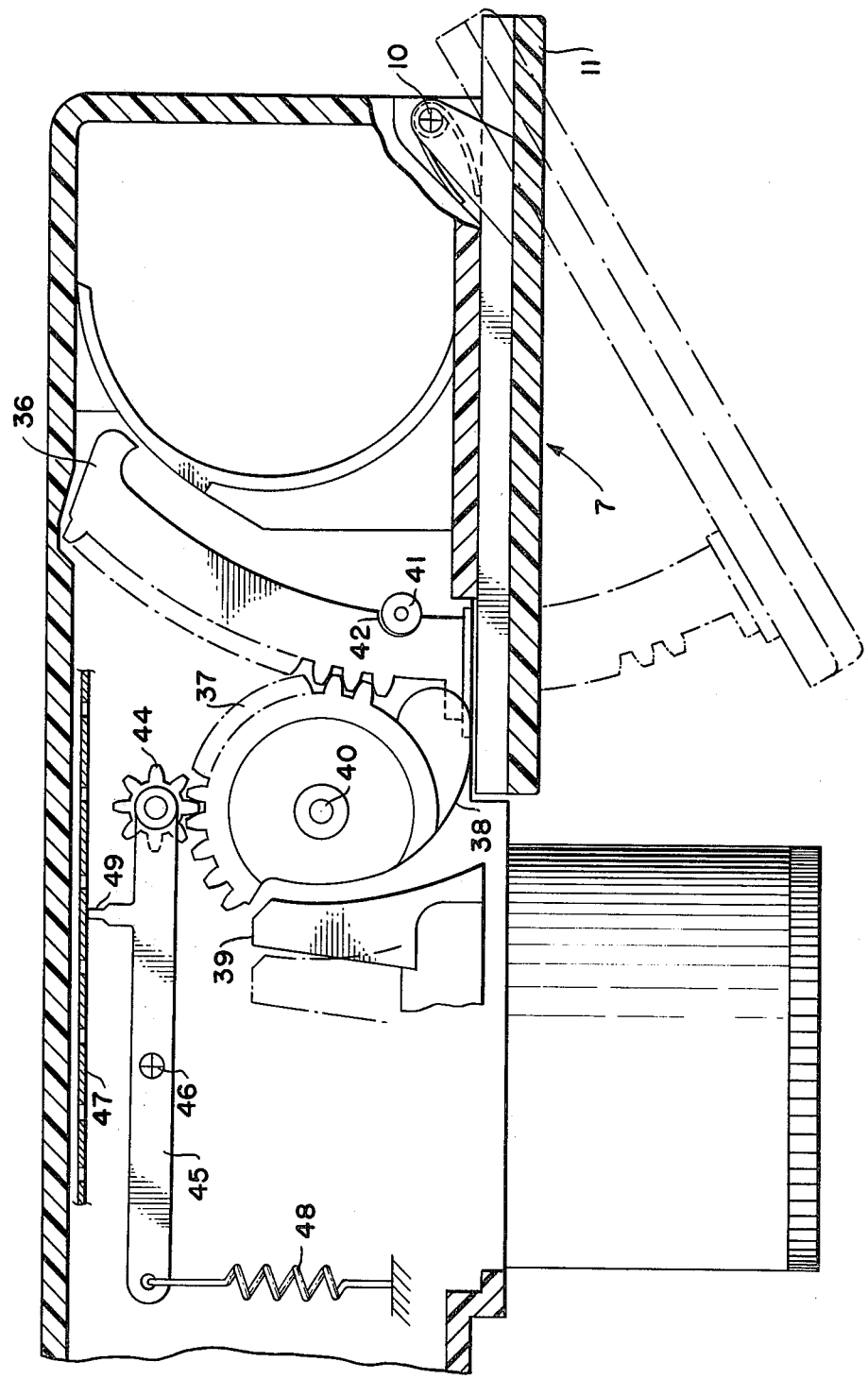
FIG. 3 is a cross-sectional view of the camera showing the film advance drive mechanism.

FIG. 2 is a cross-sectional view, illustrating only the parts of the camera which effect the projection and retraction of the lens tube 14. In particular, the mechanical connection between control handle 7 and the projection mechanism is illustrated. Coupling lever 19 is connected at the free end of the plate 8 and rotates about the bearing point 52. The free end of the coupling lever 19, which projects inside the camera housing, has a hook region 20 which is nearly closed. The loop of hook region 20 turns nearly 360° and is formed like an elongated hole. The furthest end of the free lever leg of the coupling lever 19, however, has an input 21 and a capture region 22 at hook region 20. A known projection/retraction mechanism is coupled to the hook region 20. The projection/retraction mechanism remains inside housing 1 at all times. A tenon 23 of a twin-armed angular arranged drive lever 27, which is rotatable about an axis of rotation 30, is loosely placed in the elongated hole of the hook region 20 between the input 21 and the space below the capture region 22. The other free leg of the lever 27 is attached to a connection lever 28 which is mechanically linked to lens tube 14.

When the camera is in the storage position the coupling lever 19 and drive lever 27 are in the position shown by a dash-dotted line. The tenon 23 is hinged to the hook region 20 in the capture region 22. When the control handle 7 is first rocked, after being brought to an operating position, the tenon 23 is located between the input 21 and the space located below the capture region 22. The lens tube 14 has already been projected. During the next and any further rockings the tenon 23 glides through the input 21 along the coupling lever 19 and without hinderance back into the same position. The control handle 7 can be moved freely.

When a coupling key 18 is pressed a feeler lever 25 and the free leg 19a of the coupling lever 19 swing coupling leg 19b a short distance to the right against the bias of a spring 24 attached to coupling leg 19b. Thus, the tenon 23 shifts from the position shown in FIG. 2 to the capture region 22. If control handle 7 is rocked towards the front 2 of housing 1, while coupling key 18 is depressed, the tenon 23 will glide into the capture region 22, thereby moving drive lever 27 and retracting the lens tube 14 into the housing 1. The dash-dotted outline in FIG. 2 shows the lens tube 14 and linkage in their retracted position.

The projection/retraction mechanism for the lens tube 14 will now be described. Starting from the working position of the camera shown by the solid lines in FIG. 2 a twin armed pawl 32, which rotates about bearing point 34, has one leg wedged under a drive 35. Thus, the lens tube 14 is held tightly in its operative projected position. The pawl 32 is brought into this position by means of a return spring 33, while the lens tube 14 is projected out by the lower fork leg of a forked lever 29 which rotates about bearing point 31.

In order to bring the camera into a storage position the coupling key 18 is operated as described above and the drive lever 27 pulls connection lever 28 to the right. In order to get the lens tube 14 released from the driver 35 a nose 50 on the forked lever 29 presses a cam 51 at the free end of the pawl 32 and swings pawl 32 away from the forked lever 29. During this unblocking operation the forked lever 29 is swung so far that the upper forked leg contacts the driver 35 and forces the lens tube 14 to retract. The retracted position is shown by dash-dotted lines in FIG. 2.

A control handle 7 is also operated to advance the film and cock the shutter. These operations are best shown in FIG. 3. A rack 36 is attached to the end of plate 8. Rack 36 is bent in an arc similar to that of the coupling lever 19. The teeth of rack 36 mesh with the teeth of a driving gear 37 which is rotated on an axle 40. Driving gear 37 acts in combination with a pinion 44 to drive a film advancement device not shown in the drawings. The film advancement itself takes place in partial sections through the rocking movement of control handle 7 swinging against housing 1. As soon as the film length required for one picture is advanced into position the driving gear 37 is decoupled from the film advancement device. A feeler finger 49 rides on film 47 and hooks into a certain sprocket hole of the film 47. The position of the sprocket hole depends on the picture length. Feeler finger 49 is attached to a twin-arm control lever 45, which is rotated about the axis of a bearing 46 and which is biased by a spring 48 attached to the free leg of control lever 45. When finger 49 hooks into a hole in film 47, the pinion 44 swings out of engagement with the driving gear 37.

When the control handle is first rocked towards the housing 1 the shutter is cocked. This cocking process is schematically shown in FIG. 3. One part of the circumference of the driving gear 37 has no teeth but instead has a cam 38. Opposite cam 38 there is a cocking lever 39. When driving gear 37 is first rotated the cocking lever 39 of the shutter (not shown) is shifted to the left into the dash-dotted position. Thus, the shutter is cocked. At the same time the cocking lever 39 locks and is not mechanically connected to the control handle 7 after the first rocking action. The film advancement process, however, takes two or more rocking motions. During the last necessary rocking of the control handle 7 pinion 44 is decoupled from driving gear 37 and an axially shifted detent 41, which slides vertically on its axle, falls into a scanning slot 42 provided on rack 36. The detent 41 holds control handle 7 against the housing 1 until a picture is taken.

To advance the film after taking a picture or to place the camera in a storage position the control handle 7 can only be released by removing detent 41 from the scanning slot during the first new rocking motion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A photographic camera, comprising:
   a camera housing having an aperture in the front face thereof;
   a retractable lens tube positioned in said aperture of said camera housing;
   a platelike control handle mounted on said camera housing so as to be slidable in a plane parallel to the front of said camera housing and pivotable about an axis of rotation located at a first edge of the front of said camera housing,
   a storage position wherein said platelike control handle is parallel to the front of said camera housing substantially covering said retractable lens tube, and
   an operating position wherein said platelike control handle is pivoted at an angle with respect to the front of said camera housing forming a rocking lever; and
   coupling means mechanically connected between said platelike control handle and said retractable lens tube, for projecting said retractable lens tube beyond the front of said camera housing when said platelike control handle is in said operating position.

2. A camera as set forth in claim 1, wherein said platelike control handle comprises a masking slider which is shifted in a plane parallel to the front of said camera housing and a rocker plate connected to said masking slider and pivotably connected to said first edge of the front of said camera housing.

3. A camera as set forth in claim 2, further comprising a slide guide member mounted on the front of said camera housing, said masking slide being slidable on said slide guide member.

4. A camera as set forth in claim 3, wherein said masking slider is also slidably mounted on said rocking plate.

5. A camera as set forth in claim 4, wherein said masking slider has a protruding portion which extends beyond said first edge of said camera housing when said platelike control handle is in said operating position, whereby said platelike control handle is operated as a rocking lever.

6. A camera as set forth in claims 1, 2 or 5, wherein said coupling means comprises:
   a coupling lever having a free leg, a coupling leg and a hook region pivotally connected to said control handle;
   a spring positioned between said control handle and said coupling leg;
   a feeler lever engaging said free leg and mounted on said rocker plate; and
   a coupling key engaging said feeler lever such that when said coupling key is depressed said feeler lever pushes on said free leg causing said coupling lever to pivot thereby moving said coupling leg against the bias of said spring.

7. A camera as set forth in claim 6, wherein said hook region of said coupling lever comprises a hook shaped capture region and an input region.

8. A camera as set forth in claim 7, wherein said coupling means further comprises:
   lens tube retracting means, engaging said retractable lens tube, for projecting and retracting said retractable lens tube;
   a drive lever, having a tenon, positioned between said hook region and said lens tube retracting means, said tenon normally resting in said input of said hook region, and upon said coupler key being depressed moving said coupling lever such that said tenon rides in said capture region of said hook region, whereby said lens tube is retracted when said control handle is rocked towards the front of said camera housing as said coupling key is depressed.

9. A camera as set forth in claim 5, further comprising:
   a bent rack mounted on said control handle;
   a driving gear, having a cam portion, in mesh with said bent rack;

film transport means, driven by said driving gear, for advancing camera film having a plurality of sprocket holes, into a position to be exposed; and a cocking lever, engaging said cam portion, for cocking the shutter of said camera, whereby said film is advanced by rocking said control handle.

10. A camera as set forth in claim 9, wherein said film transport means comprises:

a spring mounted on said camera housing;

a pivotable control lever, having a feeler finger and a control leg, and having a free leg biased by said spring;

a pinion, rotatably mounted on said control leg and in mesh with said drive gear; and winding means, mounted to be rotatable with said pinion, for advancing said camera film, wherein said feeler finger engages said camera film, such that when said feeler finger is forced into one of said plurality of sprocket holes said pivotable control lever is pivoted thereby pivoting said pinion out of mesh with said drive gear and stopping the advance of said camera film.

11. A camera as set forth in claim 10, wherein said bent rack has a scanning slot.

12. A camera as set forth in claim 11, further comprising detent means positioned to engage said scanning slot when said feeler finger falls in said sprocket hole, whereby said control handle is locked in a position parallel to the front of said camera housing.

* * * * *